United States Patent
Masetto

(10) Patent No.: US 9,289,697 B2
(45) Date of Patent: Mar. 22, 2016

(54) DEVICE AND PROCESS FOR REMOVING VOLATILE ORGANIC AND INORGANIC COMPOUNDS FROM POLLUTED WATERS

(71) Applicants: Polaris S.R.L., Monza (IT); S.I.A.D. S.P.A., Bergamo (IT)

(72) Inventor: Gianclaudio Masetto, Monza (IT)

(73) Assignees: POLARIS S.R.L., Monza (IT); S.I.A.D. S.P.A., Bergamo (IT)

(*) Notice: Subject to any disclaimer, the term of this patent is extended or adjusted under 35 U.S.C. 154(b) by 0 days.

(21) Appl. No.: 14/440,971

(22) PCT Filed: Nov. 6, 2013

(86) PCT No.: PCT/IB2013/002462
§ 371 (c)(1),
(2) Date: May 6, 2015

(87) PCT Pub. No.: WO2014/072792
PCT Pub. Date: May 15, 2014

(65) Prior Publication Data
US 2015/0265942 A1 Sep. 24, 2015

(30) Foreign Application Priority Data

Nov. 6, 2012 (IT) ............................. AN2012A0143

(51) Int. Cl.
*B01D 5/00* (2006.01)
*B01D 53/02* (2006.01)
*B01D 19/00* (2006.01)
(Continued)

(52) U.S. Cl.
CPC .......... *B01D 5/0012* (2013.01); *B01D 19/0005* (2013.01); *B01D 19/0015* (2013.01); *C02F 1/20* (2013.01); *C02F 1/26* (2013.01);
(Continued)

(58) Field of Classification Search
None
See application file for complete search history.

(56) References Cited

U.S. PATENT DOCUMENTS 3,418,214 A 12/1968 Cane
3,690,040 A 9/1972 Halfon
(Continued)

FOREIGN PATENT DOCUMENTS

EP 1167905 A2 2/2002
EP 2471746 A1 * 7/2012
WO 2004103513 A1 12/2004

OTHER PUBLICATIONS

Translation of EP 2471746 A1, accessed Jul. 23, 2015.*
(Continued)

*Primary Examiner* — Duane Smith
*Assistant Examiner* — Phillip Shao
(74) *Attorney, Agent, or Firm* — Saltamar Innovations; Shalom Wertsberger

(57) ABSTRACT

A device (1) for removing volatile compounds from polluted waters, comprising: a) a stripping column (2) for desorption of the volatile organic compounds from the water to be purified, b) means (3; 3a, 5) for separating the volatile compounds from the stripping gas that flows out of said stripping column (2); c) a vacuum pump (4) connected on the suction side to said outflow line (24) for stripping gas and connected on the delivery side to said means (3; 3a, 5) for separating the volatile organic compounds from a gas; d) said means (3; 3a, 5) comprising a cryogenic condensation unit (3), with an outflow line (34) for refrigerant wherein said outflow line (34) for fluid refrigerant of said cryogenic condensation unit (3) communicates with said inflow line (23) for stripping gas, for supplying said stripping column (2).

11 Claims, 4 Drawing Sheets

(51) Int. Cl.
*C02F 1/20* (2006.01)
*C02F 1/26* (2006.01)
*C02F 101/32* (2006.01)
*C02F 101/36* (2006.01)
*C02F 103/06* (2006.01)
*C02F 101/30* (2006.01)

(52) U.S. Cl.
CPC ...... *C02F 2101/30* (2013.01); *C02F 2101/322* (2013.01); *C02F 2101/36* (2013.01); *C02F 2103/06* (2013.01)

(56) References Cited

U.S. PATENT DOCUMENTS

| | | | | |
|---|---|---|---|---|
| 4,783,242 | A * | 11/1988 | Robbins | 203/87 |
| 8,500,868 | B2 * | 8/2013 | Adams et al. | 95/247 |
| 2002/0000096 | A1 * | 1/2002 | Trembley et al. | 62/637 |
| 2010/0319397 | A1 * | 12/2010 | Lee et al. | 62/640 |

OTHER PUBLICATIONS http://www.triplan-umwelttechnick.com/en/stripkolonnen/.

* cited by examiner

DEVICE AND PROCESS FOR REMOVING VOLATILE ORGANIC AND INORGANIC COMPOUNDS FROM POLLUTED WATERS

There are disclosed herein a device and a process for continuous removal and recovery of volatile organic compounds in polluted waters.

The device and process as disclosed herein particularly find application in purification of groundwater contaminated by volatile organic compounds, such as chlorinated or aromatic solvents, or volatile inorganic compounds.

The device and process as disclosed herein are particularly suitable for treatment of water having a low pollutant concentration.

As used herein, the term "water with low pollutant concentration" is intended to designate water with a pollutant concentration of less than 500 ppm (weight/volume).

In recent years, groundwater recovery has become an urgent need.

Pollutants released into the ground may enter the food chain to man or may reach underground water to eventually pollute drinking water for man.

Some of the main causes of ground pollution particularly consist of certain organic solvents.

These solvents have various adverse effects on human health, and may particularly damage the liver, the kidneys, the heart, the blood vessels, the bone marrow and the nervous system.

A number of technologies are currently known in the art for purification of polluted groundwater.

For low-concentration pollution levels, typically of nor more than 500 ppm weight/volume, water is known to undergo a vacuum stripping process (i.e. at a pressure below atmospheric pressure) with air to remove the volatile organic compounds contained in water.

As pollutants are transferred to the stripping air, they may be separated therefrom by means of activated carbon adsorption filters.

A brief description of this first prior art is found in http://www.triplan-umwelttechnik.com/en/stripkolonnen/.

Patent WO 2004/103515 discloses an intermittently operating apparatus for purifying water from volatile organic components.

According to this second prior art, an intermittent (batch) purification process is carried out, using a container with an amount of polluted water loaded therein.

This polluted water is heated by steam and hot nitrogen is bubbled therein.

The stream that comes out of the container successively passes through a water-cooled condenser and a liquid-nitrogen cooled cryogenic condenser.

The nitrogen gas that flows out of the cryogenic condenser is heated and introduced into the water treatment container.

The separation of water pollutants afforded by the device as disclosed in WO 2004/103513 has a poor efficiency.

This is particularly caused by the very low pollutant/water volume ratio of the stream that comes out of the tank.

This is because WO 2004/103513 suggests no device or technology for obtaining a fractionation effect.

Prior art technologies are inadequate, either for the high management costs required by purification plants or for their poor efficiency.

The main object of this invention is to suggest a solution to obviate at least some of prior art problems and particularly those set out hereinbefore.

This object is fulfilled by a device as defined in claim 1 and a process as defined in claim 7.

Further advantages may be obtained by the additional features of the dependent claims.

Certain possible embodiments of a device for carrying out a process for continuous removal and recovery of volatile polluting compounds, such as organic solvents, from groundwater are described hereafter with reference to the annexed drawings, in which.

In the annexed figures, numeral 1 generally designates a device for removing volatile organic compounds from polluted waters.

The embodiments described herein have in common the presence of a stripping column 2, which is designed for continuous desorption of the volatile organic compounds contained in the water to be purified.

The stripping column 2 may be a packed column, e.g. a geometrically- or dump-packed column.

In an alternative embodiment, the stripping column 2 is a sieve tray column.

In a further alternative embodiment, the stripping column 2 is a spray nozzle having multiple spray nozzles. Preferably, the stripping column 2 should have a high fractionation efficiency.

The stripping column 2 is connected: to an inflow line for water to be purified, to an outflow line 22 for purified water, to an inflow line 23 for stripping gas and to an outflow line 24 for stripping gas (a water-saturated gas containing volatile organic compounds removed from water).

In the stripping column 2, the water to be purified flows from top to bottom, whereas the stripping gas flows from bottom to top.

In the illustrated embodiments, the stripping column 2 extends vertically.

Figure 1:
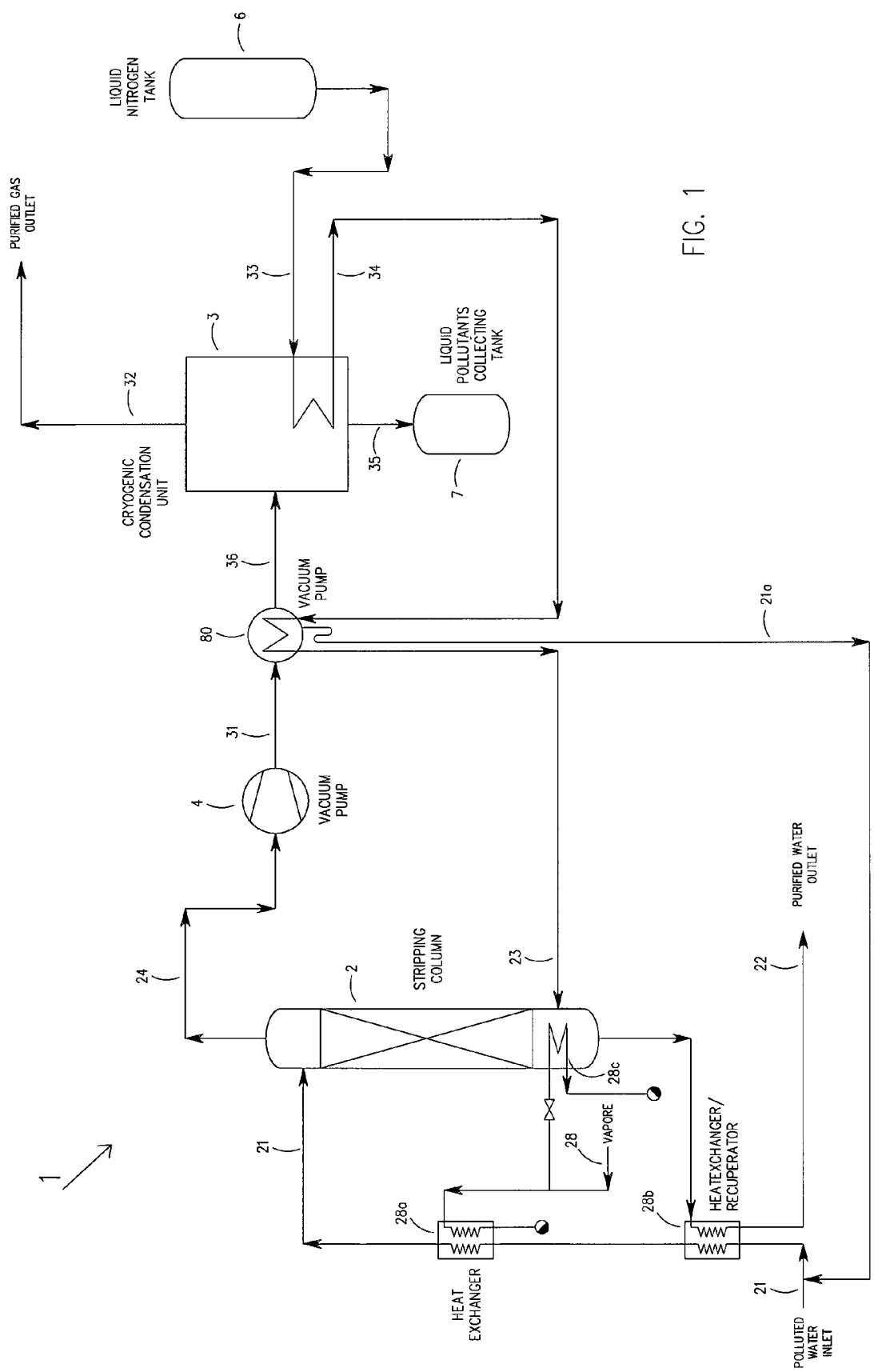
FIG. 1 is a schematic view of a device for continuous removal of volatile organic compounds contained in groundwater.
Figure 2:
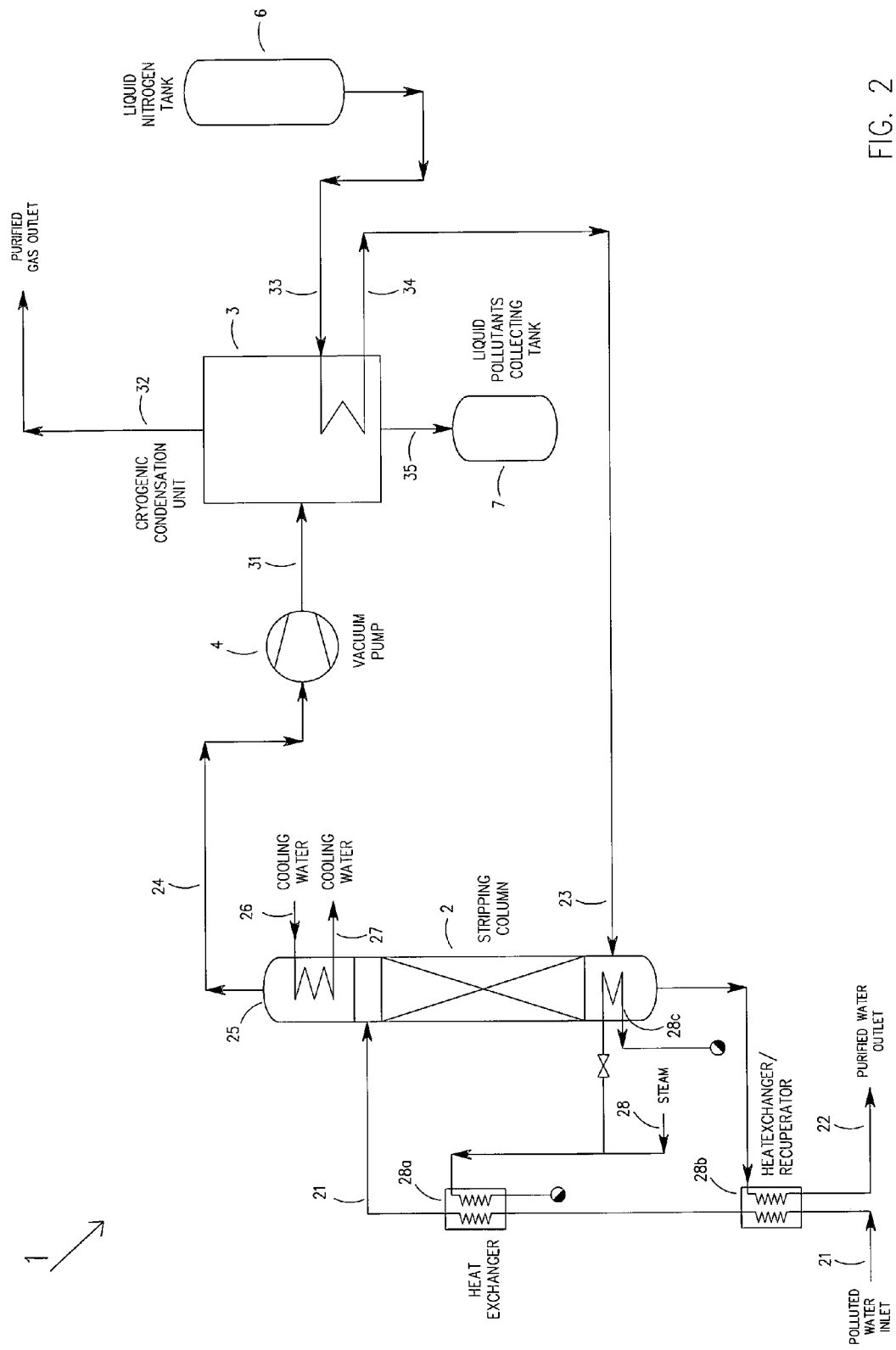
FIG. 2 shows a variant of the device of FIG. 1.
Figure 3:
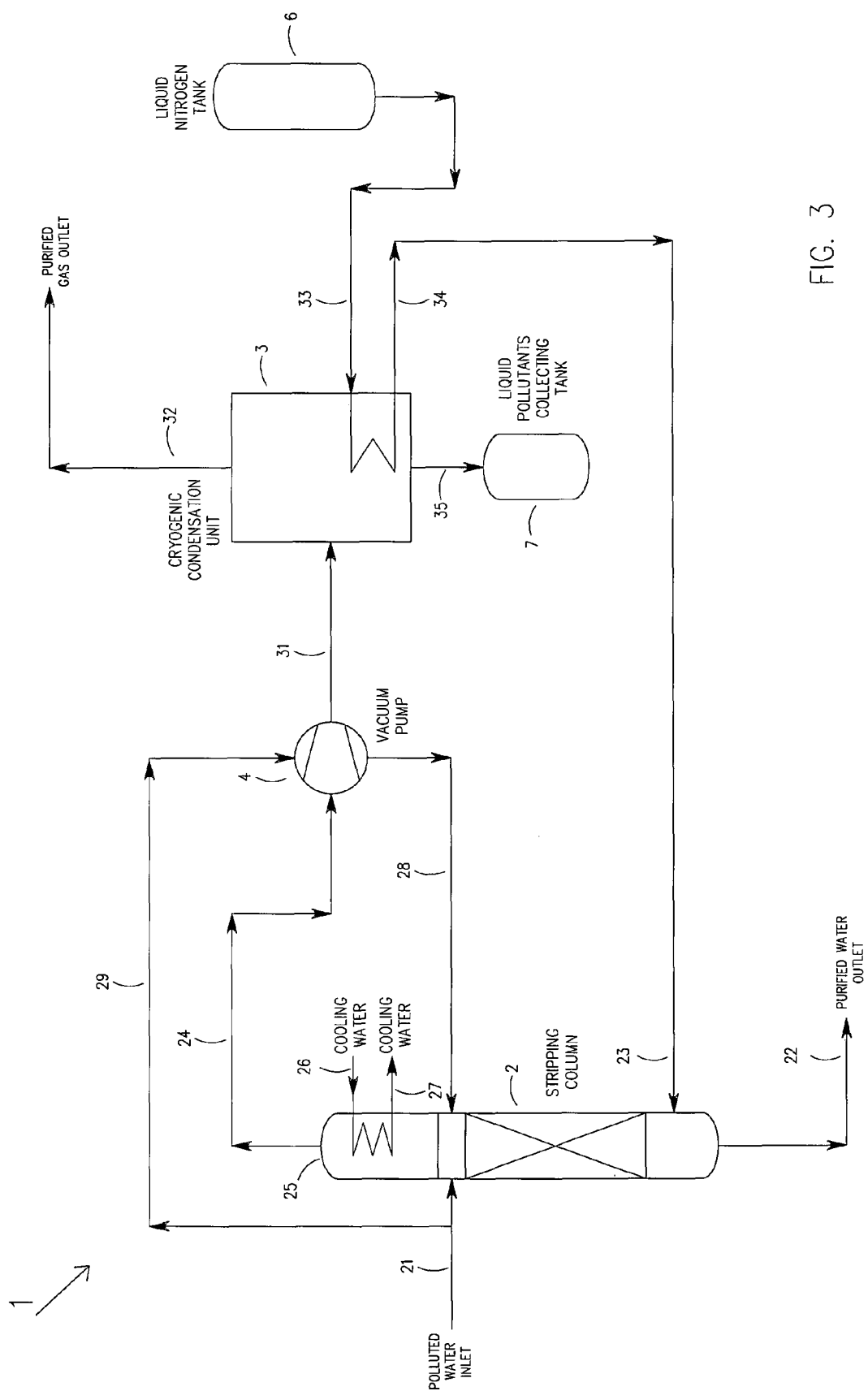
FIG. 3 shows another variant of the device of FIG. 1.
Figure 4:
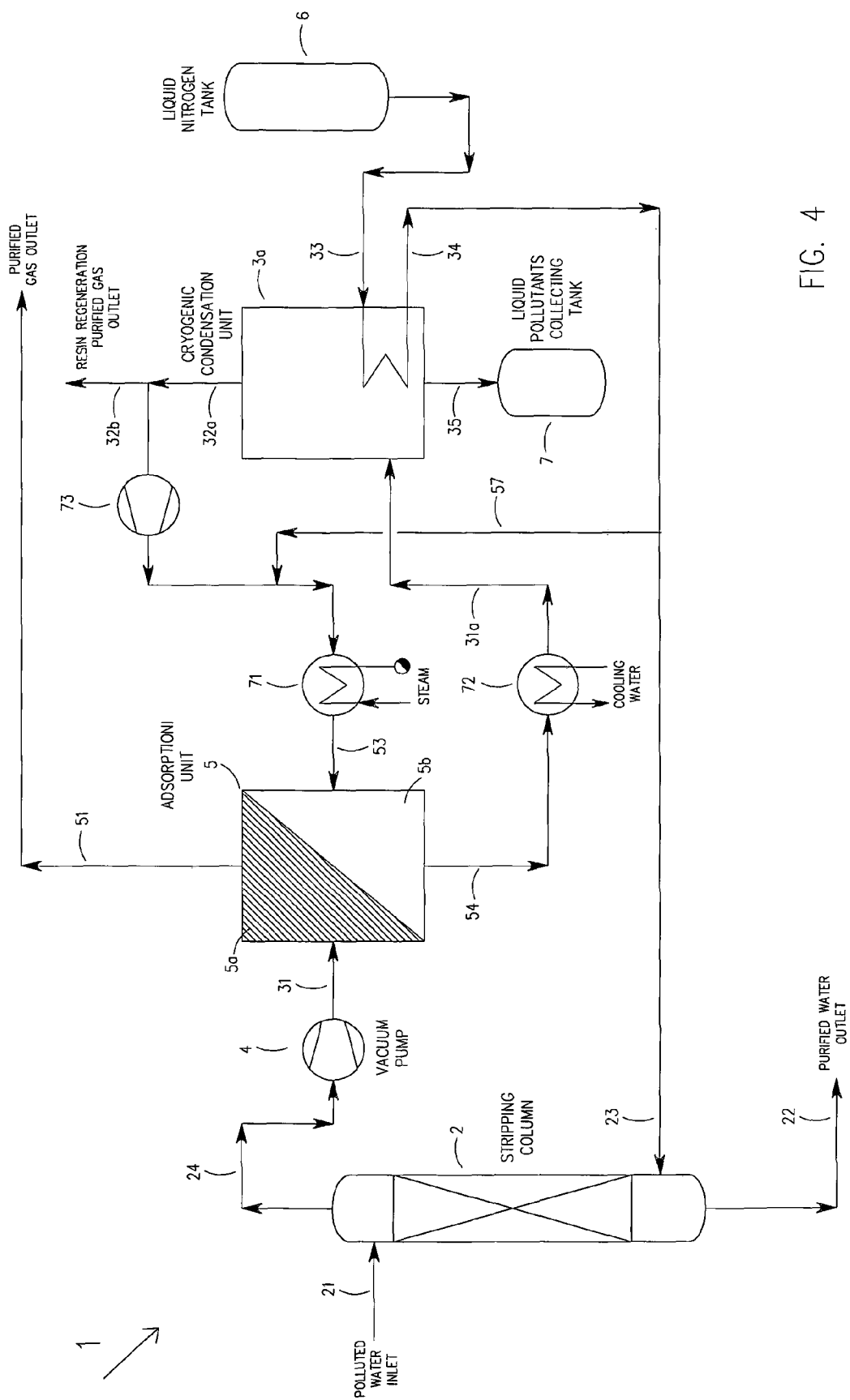
FIG. 4 shows a further variant of the device of FIG. 1.

The stripping column 2 has an internal-reflux fractionating column 25 like the one disclosed in EP 0 513 704 by the inventor hereof (while this solution is shown in FIGS. 2 and 3, it shall be understood that it may be also used in other embodiments, like those of FIGS. 1 and 4).

Yet another feature that the illustrated embodiments have in common is the presence of means 3; 3a, 5 (described below in greater detail) for separating the volatile organic compounds from the gas that comes out of the stripping column 2.

A further feature that the various illustrated embodiments have in common is the presence of a vacuum pump 4 which is connected, on the suction side, to the outflow line 24 for the water-saturated stripping gas containing the volatile organic compounds and, on the delivery side, to the means 3; 3a, 5 for separating the volatile organic compounds contained in the water-saturated gas that comes out of the stripping column 2.

The vacuum pump 4 reduces vapor pressure and facilitates the transfer of the volatile organic compounds from the liquid phase to the gaseous phase in the stripping column 2.

Furthermore, the negative pressure created by the vacuum pump 4 increases, in the gaseous phase, the concentration of volatile compounds relative to water.

This is particularly advantageous when treating low-temperature water, such as groundwater, whose average temperature is from about 10° C. to about 12° C.

This will avoid the need to heat up the water to be purified or allow less heat energy to be provided to the water to be purified.

The vacuum pump 4 may be a liquid ring pump or a dry pump.

In all the embodiments the means 3; 3a, 5 for separating the volatile organic compounds contained in the water-saturated gas that flows out of the stripping column 2 use at least one cryogenic condensation unit 3.

The cryogenic condensation unit 3 in turn comprises: an inflow line 31, 31a for gas to be purified (containing volatile organic compounds), an outflow line 32, 32a for purified gas (substantially free of any volatile organic compound), an inflow line 33 for refrigerant, an outflow line 34 for refrigerant and a discharge line for the condensed compounds.

The condensed pollutants and those that are solidified and later liquefied in the cryogenic condensation unit 3, 3a are discharged through the line 35 and collected in a tank 7.

For simplicity, a single cryogenic condensation unit 3, 3a is only shown in the accompanying drawings.

The efficiency of the cryogenic condensation process tends to decrease with time, due to the formation of solidified water on the heat exchange surfaces.

In view of maintaining the continuity of the cryogenic condensation process, the inventor suggests the use of two alternately operating cryogenic condensation units.

For simplicity, the solution of using two alternately operated cryogenic condensation units is not shown in the accompanying drawings, but is anyway contemplated by the inventor.

While one of the two cryogenic condensation units is operating, the other cryogenic condensation unit undergoes a defrosting process to remove the solid deposits (composed of water and polluting compounds) previously formed and deposited on the surfaces of the heat exchangers.

For this purpose, the gas stream to be purified is cooled to reduce its water content and later heated and circulated first in the idle cryogenic condensation unit, where it releases heat and causes liquefaction of ice therein, and then in the operating cryogenic condensation unit, where pollutants are recovered.

A further feature that the various embodiments have in common is that the outflow line 34 for the gasified fluid refrigerant is in communication with the inflow line 23 leading to the stripping column 2 thereby providing at least part of the stripping gas required to feed the column.

This feature reduces the management costs for the device 1 and ensures totally safe operation.

In the various embodiments, the device comprises a liquid nitrogen tank 6 for supplying the refrigerant inflow line 33 in the cryogenic condensation unit 3, 3a.

The pressure of the gas (nitrogen) that flows into the column 2 through the inflow line 23 is sufficient to create a gas stream in the column 2 without requiring fans.

In the various embodiments of the device 1, a heat exchanger 80 may be provided downstream from the vacuum pump 4, for cooling the stream that comes out of the vacuum pump 4 and condensing part of the water contained in the stream (while for simplicity this solution has been only shown in FIG. 1, it shall be understood that it may be also used in the embodiments of FIGS. 2, 3 and 4).

The exchanger 80 is supplied with water (e.g. groundwater) or, preferably, with nitrogen that flows from the outlet 34 of the cryogenic unit 3; 3a (see FIG. 1).

The latter solution affords both advantages of reducing liquid nitrogen consumption by the cryogenic unit 3; 3a (because the gas to be purified has a lower temperature and a lower water content) and of improving the efficiency of the stripping process in the column 2, by also reducing the amount of heat to be possibly applied to the water to be purified (because the nitrogen introduced into the stripping column is at a higher temperature).

Referring now to FIG. 1, the device 1 comprises a stripping column 2, which is designed for continuous gas desorption of the volatile organic compounds contained in the water to be purified.

The stripping column 2 is connected: to an inlet line 21 for water to be purified, to an outlet line 22 for purified water, to an inlet line 23 for stripping gas and to an outlet line 24 for stripping gas (which is saturated with water and contains volatile organic compounds).

The inflow line 23 for stripping gas is at the base of the column 2, whereas the outflow line 24 for stripping gas is located at the top of the column 2.

In the stripping column 2, volatile organic compounds are transferred by desorption from the descending liquid phase to the ascending gaseous phase.

In order to facilitate desorption of volatile organic compounds, a vacuum pump 4 is provided downstream from the outlet line 24 for the stripping gas, said pump being connected on the suction side to the gas outflow line 24 of the stripping column 2.

The required degree of vacuum may vary according to the nature of the volatile organic compounds to be recovered.

For dichloroethane recovery, gas pressure at the outlet of the stripping column is reduced to 50 mbar or less.

To further facilitate desorption of volatile organic compounds, the temperature of the water to be purified may be increased by a few degrees centigrade.

For this purpose, a heat exchanger 28a may be provided, which is supplied by a hot fluid (e.g. steam) supply line 28.

The water to be purified may be also heated by other means, such as an electric resistor.

In order to minimize the energy consumption associated with such weak heating, a part of heat may be recovered by countercurrent heat exchange, in a second exchanger 28b, between the stream of purified water 22 that comes out of the bottom of the column 2 and the stream of the water to be purified 21 that is fed to the column.

A cryogenic condensation unit 2 is provided downstream from the vacuum pump 4.

The cryogenic condensation unit 3 is connected to: an inlet line 31 for the gas to be purified (supplied by the vacuum pump 4), an outlet line 32 for the purified gas, an inflow line 33 for refrigerant and an outflow line 34 for refrigerant.

In the cryogenic condensation unit 3, the gas stream that flows from the pump 4 and is supplied through the inflow line 31 is cooled by indirect heat exchange, which will provide separation of the volatile organic compounds by condensation and solidification.

The polluting compounds separated in the cryogenic condensation unit 3 are discharged in the liquid state through a discharge line 35 and collected in a tank 7, for later appropriate destruction or disposal.

The outflow line 34 for fluid refrigerant communicates with the inflow line 23 for stripping gas, for at least partially supplying the stripping column 2.

The operation of the plant requires a liquid nitrogen tank 6 for supplying the refrigerant inflow line 33 in the cryogenic condensation unit 3, 3a.

The polluting compound vapors are progressively cooled to condensation and solidification of the last amounts thereof in the cryogenic condenser 3, for separation from the gaseous phase.

The stream of purified gas that comes out of the line 32 of the cryogenic condensation unit 3 is thus purified from polluting compounds in compliance with legal limits.

One feature of the device for recovering volatile organic compounds from polluted water is that at least part of the evaporated cooling fluid is used as stripping gas.

This arrangement will reduce groundwater depollution costs.

The cryogenic fluid that is used for cooling the cryogenic unit 3 is liquid nitrogen.

The use of liquid nitrogen allows the cryogenic unit 3 to operate to temperatures close to the liquid nitrogen boiling point (−196° C.).

This will allow trouble-free solidification of the volatile organic pollutants originally contained in the stream 24 that comes out of the stripping column 2 to the last traces.

The evaporated nitrogen that flows out of the outflow line is at least partially introduced into the column 2 as stripping gas through the inflow line 23.

A heat exchanger 80 having nitrogen gas supplied countercurrent thereto from the outflow line 34 for the refrigerant of the cryogenic condensation unit 3, is provided between the vacuum pump 4 and the inlet line 31 to the cryogenic condensation unit 3.

As the gas stream from the vacuum pump 4 is cooled, the water contained in the stream is partially condensed.

The condensed water, which is polluted, is reintroduced into the groundwater purification circuit through a line 21a.

The presence of the condenser 80 reduces the nitrogen consumption required for the operation of the cryogenic condensation unit 3.

In a second embodiment, as shown in FIG. 2, the stripping column 2 is supplemented at its top by an internal-reflux distillation section 25 that operates under high vacuum conditions provided the use of the vacuum pump 4.

The distillation section 25 consists of a structured packing, which is cooled by an upper water inflow line 26, with water flowing out through a lower outflow line 27, said packing ensuring a stronger fractionation of the organic pollutant from the gas stream that flows out of the underlying column section.

This will reduce the overall amount of water contained in the gas stream that flows out of the outflow line 24 of the column 2 and will accordingly reduce the cryogenic energy used in the cryogenic unit 3, besides increasing the possibility of using the polluting compounds collected in the tank 7.

In the example as shown in FIG. 2, the heat energy required for the operation of the distillation section 25 is provided by a heat source (e.g. a steam source or an electric resistor) to the polluted water supplied to the column 2.

The polluted water supplied to the stripping column 2 is heated to the required temperature by the heat exchanger 28a (external to the column stripping) which is supplied with steam by a steam supply line 28.

In view of increasing the energy efficiency of the device 1, a second heat exchanger 28b (external to the stripping column) is provided, to at least partially recover heat from the purified water that flows out of the outflow line 22.

Additional heat energy may be possibly provided by a third heat exchanger 28c (internal to the stripping column in an intermediate position or on the bottom, as shown), which is supplied with steam by the steam supply line 28.

In a third embodiment, as shown in FIG. 3, the vacuum pump 4 is a liquid ring pump.

In this case, the pump 4 is connected to a water inflow line 29 and a water outflow line 28.

The water stream supplied to the inflow line 29 may be drawn from the inflow line 21 for the water to be purified, which is fed to the stripping column 2.

The water discharged through the outflow line 28 is also fed to the stripping column 2.

The embodiment of FIG. 3 may also provide means (not shown) for heating the water to be purified and recovering heat from the purified water, like in the example of FIGS. 1 and 2.

Like in FIG. 2, in the embodiment of FIG. 3 the stripping column 3 may be supplemented at its top by an internal-reflux distillation section 25 that operates under high vacuum conditions provided the use of the vacuum pump 4.

Like in FIG. 1, the gas stream that flows out of the vacuum pump 4 may be cooled before being reintroduced into the cryogenic condensation unit 3 (not shown).

In a fourth embodiment, as shown in FIG. 4, the gas stream that flows out of the vacuum pump 4, which contains the polluting compounds, is fed to a resin adsorption unit 5.

Preferably, the adsorption unit 5 comprises at least two alternately operated fixed absorbent beds 5a, 5b.

As more clearly described hereinafter, one resin bed 5a is used for the process of purification of the gas stream that flows out of the vacuum pump 4, while the other resin bed 5b undergoes resin regeneration.

In a possible embodiment, the adsorption unit 5 uses, as adsorbents, macroporous styrene-divinylbenzene resins, which are highly hydrophobic, such that only the organic compounds are quantitatively retained, whereas the purified gas stream contains the water stripped from the column 2 and may be reintroduced into the environment (through the line 51).

The adsorption unit 5 is connected: to an inflow line 31 for gas to be purified (connected to the delivery side of the vacuum pump 4), and to an outflow line 51 for purified gas, for gas discharge into the atmosphere.

Once the adsorption capacity of a resin bed is exhausted, the bed may be regenerated by a special regeneration circuit, with a hot flow of regeneration gas (nitrogen) circulating therein.

For this purpose, the adsorption unit 5 comprises an inflow line 53 for regeneration gas and an outflow line 54 for regeneration gas, the latter containing the desorbed pollutants, and substantially no water.

In the illustrated embodiment, the regeneration circuit comprises a cryogenic unit 3a connected to: an inflow line 31a for regeneration gas, an outflow line 32a for regeneration gas, an inflow line 33 for refrigerant and an outflow line for refrigerant.

The nitrogen that flows out of the outflow line 32a is free of polluting compounds and part of it is introduced into the atmosphere (through the line 32b), whereas the remaining part is recycled for the adsorption unit 5 through the inflow line 53.

A fan 73 and a heat exchanger 71, supplied with steam or another heating means are placed upstream from the inflow line 51, to allow the regeneration gas to reach the adsorption unit 5 with an adequate flow rate and at an effective temperature for resin desorption.

The inflow line 31a that leads to the cryogenic unit 3a is connected to the outflow line 54 for regeneration gas through a second heat exchanger 72, which has the purpose of pre-cooling the regeneration gas before it enters the cryogenic unit 3a.

In the embodiment of FIG. 4, the refrigerant to be fed to the cryogenic unit 3a is liquid nitrogen, which comes from a tank 6 and is introduced through the inflow line 33.

Nitrogen gas flows out of the outflow line 34; at least part of the nitrogen gas stream that comes out of the outflow line 34 is used to feed the stripping column 2 (through the line 23)

and to partially supplement (through the line 57) the regeneration circuit of the adsorption unit 5.

The pollutants desorbed by the adsorption unit 5 and later condensed in the cryogenic condensation unit 3a are collected in a tank 7 and later recovered for reuse or destruction.

The embodiment of FIG. 4 may also provide heat exchangers (not shown) for heating the water to be purified and recovering heat from the purified water, like in the example of FIG. 2.

Like in FIG. 2, also in the embodiment of FIG. 4 the stripping column 3 may be supplemented at its top by an internal-reflux distillation section 25 that operates under high vacuum conditions provided the use of the vacuum pump 4 (not shown).

Like in FIG. 1, the gas stream that comes out of the vacuum pump 4 may be cooled before being reintroduced into the cryogenic condensation unit 3 (not shown).

The devices of FIGS. 1, 2 and 3 may be used to implement a process for removing volatile organic compounds from polluted water, comprising the steps of:

a) vacuum stripping a (possibly pre-heated) polluted water stream to obtain a water-saturated stripping gas, enriched with volatile organic compounds removed from the polluted water;

b) progressively cooling the water-saturated stripping gas outflow, enriched with volatile organic compounds by indirect heat transfer, such progressive cooling step reaching a temperature below solidification temperature of the volatile organic compounds to be recovered, such cooling step occurring by evaporation of a liquefied gas (e.g. liquid nitrogen);

c) using at least part of the evaporated liquefied gas as a stripping gas.

With the device of FIG. 4, the process of removing volatile organic compounds from polluted process comprises, before cryogenic cooling, the additional step of:

transferring the volatile organic compounds from the water-saturated first gas stream to a substantially water-free second gas stream.

Volatile organic compounds are transferred from the first to the second gas streams using adsorption beds made of hydrophobic macroporous resins that only retain organic compounds and not water, such that the stream purified from the volatile polluting compounds may be reintroduced into the atmosphere.

Macroporous resins temporarily store the volatile organic compounds removed from the water-saturated gas stream to saturation.

Resin beds are regenerated by hot desorption of volatile organic compounds, using part of the nitrogen gas produced during cryogenic cooling for this purpose.

Regeneration of hydrophobic resins occurs by closed-loop circulation of gas (nitrogen) between the adsorption bed to be regenerated and the cryogenic condensation unit.

For this purpose, the gas stream is heated to reach effective temperatures for desorption of volatile organic compounds, later pre-cooled and finally cooled to cryogenic temperatures for quantitative separation of the volatile organic compounds from the gas stream and collection thereof.

This will minimize cryogenic energy consumption, as water contained in the original polluted stream does not reach the cryogenic condensation unit 3a.

Example of Device Operation (Embodiment of FIG. 1)

A stream of groundwater 21, polluted with 1,2-dichloroethane, having the following properties:

| | |
|---|---|
| water flow rate | 23,000 l/hour |
| pressure | 1.013 bar |
| temperature | 10° C. |
| pollutant flow rate | 1.15 kg/h | is fed to the top of the stripping column 2, held at a pressure of 0.05 bar, by the vacuum pump 4.

A stream of nitrogen gas 23 having the following properties:

| | |
|---|---|
| gas flow rate | 20 Nm$^3$/h |
| pressure | 2.0 bar |
| temperature | 20° C. | is fed to the base of the same column from the cryogenic condensing unit 3.

The head of the column 2 feeds a stream 24 having the following features:

| | |
|---|---|
| water flow rate | 5.3 kg/h |
| 1,2-dicholoroethane flow rate | 1.046 kg/h |
| nitrogen flow rate | 24.99 kg/h |
| pressure | 0.05 bar |
| temperature | 10.03° C. | and the bottom feeds a stream 22 of purified water having the following features:

| | |
|---|---|
| water flow rate | 22.994 kg/h |
| dicholoroethane flow rate | 0.1035 kg/h |
| pressure | 0.05 bar |
| temperature | 9.93° C. |

Pollutant concentration in the groundwater so treated is reduced to 0.45 mg/l.

The above described groundwater purification process is allowed by the operating conditions obtained with the illustrated device which provides, in addition to the stripping column 2, the use of a cryogenic condensation unit 3 for purification of the gas stream 24 that flows out of the head of such column. Thus, the gas stream 24 sucked in by the vacuum pump 4 is later sent to the cryogenic condensation unit 3 in which, as it enters from the bottom, it is cooled by indirect countercurrent heat exchange from a stream of liquid nitrogen 33 which gasifies and is used as a stripping gas 23 in the striping column 2. In the cryogenic condensation unit 3, the supplied stream 31 is cooled to progressively decreasing temperatures by indirect countercurrent heat exchange, at least to −105° C., to obtain first condensation and then almost total solidification of the 1,2-dichloroethane (melting point −35.3° C.). The final gas stream 32 that flows out of the cryogenic unit 3 may be introduced into the atmosphere as it only contains traces of 1,2-dichloroethane (concentration of less than 5 mg/Nm$^3$ in 20 Nm$^3$/h of overall stream). Since ice and solid dichloroethane form and build up in the cryogenic condensation unit 3, the latter is configured as a double line, to allow regeneration by defrosting, with collection of liquid (stream 35) in the tank 6, where two immiscible phases form. The dichloroethane so separated is collected for proper disposal.

The invention claimed is:

1. A device for continuously removing volatile organic compounds from polluted waters, comprising:
   a) a countercurrently operating stripping column for desorption of the volatile organic compounds from the water to be purified, said stripping column comprising
      an inflow line for water to be purified;
      an outflow line for purified water;
      an inflow line for stripping gas;
      an outflow line for stripping gas;
   b) a separator for separating the volatile compounds from the stripping gas that flows out of said stripping column, said separator comprising a hydrophobic macro-porous resin adsorption unit and a cryogenic condensation unit;
      said adsorption unit comprises:
         an inflow line for stripping gas to be purified, coupled with said outflow line for stripping gas;
         an outflow line for purified stripping gas;
         an inflow line for regeneration gas; and
         an outflow line for regeneration gas;
      said cryogenic condensation unit comprises
         an inflow line for regeneration gas to be purified, coupled with said outflow line for regeneration gas of said adsorption unit;
         an outflow line for purified gas, said outflow line coupled with said inflow line for regeneration gas of said adsorption unit;
         an inflow line for refrigerant;
         an outflow line for refrigerant, said outflow line for refrigerant coupled with said inflow line for stripping gas for supplying said stripping column;
         a discharge line for condensed compounds;
   the device further comprising:
      a liquid nitrogen inlet for supplying said refrigerant inflow line of said cryogenic condensation unit;
      a heater, for heating said regeneration gas, coming from said cryogenic unit, before it enters into said adsorption unit and,
      a cooler for cooling said regeneration gas, coming from said adsorption unit, before it enters said cryogenic unit.

2. A device according to claim 1, further comprising a vacuum pump coupled between said inflow line for stripping gas to be purified of said adsorption unit, and to said outflow line for stripping gas of the stripping column.

3. A device according to claim 2, wherein said vacuum pump is a liquid ring pump, and wherein said liquid ring pump is supplied with water drawn from the inflow line for the water to be purified and wherein the water that flows out of said pump is conveyed to said stripping column.

4. A device according to claim 1 further comprising an internal reflux distillation section disposed at the top of said stripping column.

5. A device according to claim 1, further comprising a first heat exchanger for heating the polluted water supplied to said stripping column.

6. A device according to claim 1, further comprising a second heat exchanger for recovering heat from the purified water that flows out of said stripping column.

7. A device according to claim 1, further comprising:
   a first heat exchanger for heating the polluted water supplied to said stripping column; and,
   a second heat exchanger for recovering heat from the purified water that flows out of said stripping column.

8. A device according to claim 7 wherein heat recovered from the purified water in said second heat exchanger is utilized for heating the polluted water in said first heat exchanger.

9. A device according to claim 7 wherein said first and second heat exchangers are integrated.

10. A device according to claim 1, wherein heat obtained from the regeneration gas in said cooler is utilized in said heater to heat the regeneration gas.

11. A device according to claim 1 wherein said heater and said cooler are integrated.

* * * * *